(12) United States Patent
Balakrishnan et al.

(10) Patent No.: US 9,778,844 B2
(45) Date of Patent: Oct. 3, 2017

(54) INSTALLATION OF OPERATING SYSTEM ON HOST COMPUTER USING VIRTUAL STORAGE OF BMC

(71) Applicant: AMERICAN MEGATRENDS, INC., Norcross, GA (US)

(72) Inventors: Venkatesan Balakrishnan, Chennai (IN); Valantina Arumugam, Chennai (IN)

(73) Assignee: AMERICAN MEGATRENDS, INC., Norcross, GA (US)

( * ) Notice: Subject to any disclaimer, the term of this patent is extended or adjusted under 35 U.S.C. 154(b) by 230 days.

(21) Appl. No.: 14/277,355

(22) Filed: May 14, 2014

(65) Prior Publication Data

US 2015/0331694 A1    Nov. 19, 2015

(51) Int. Cl.
| | |
|---|---|
| *G06F 13/12* | (2006.01) |
| *G06F 3/06* | (2006.01) |
| *G06F 9/44* | (2006.01) |
| *G06F 9/445* | (2006.01) |

(52) U.S. Cl.
CPC .............. *G06F 3/06* (2013.01); *G06F 3/0607* (2013.01); *G06F 3/0664* (2013.01); *G06F 3/0679* (2013.01); *G06F 8/61* (2013.01); *G06F 9/44* (2013.01); *G06F 9/4401* (2013.01); *G06F 9/4408* (2013.01); *G06F 2206/1014* (2013.01)

(58) Field of Classification Search
CPC ....................................................... G06F 1/263
See application file for complete search history.

(56) References Cited

U.S. PATENT DOCUMENTS

| | | | |
|---|---|---|---|
| 7,764,682 B2 * | 7/2010 | Sievert ................ | H04L 12/4633 370/389 |
| 2010/0228960 A1 * | 9/2010 | Huang ...................... | G06F 8/65 713/100 |

\* cited by examiner

*Primary Examiner* — Henry Tsai
*Assistant Examiner* — Juanito Borromeo
(74) *Attorney, Agent, or Firm* — Locke Lord LLP; Tim Tingkang Xia, Esq.

(57) ABSTRACT

Certain aspects of present disclosure are directed the present disclosure relates to a baseboard management controller (BMC) implemented method of installation of operating system (OS) on a host computer using virtual storage of BMC. The method includes: (a) receiving a device request from the host computer to access a storage device, (b) simulating the storage device to host computer according to the device request, (c) receiving a data request command from host computer, (d) transferring requested data to the host computer according to the data request command, (e) receiving a data storage command from host computer directed to the simulated storage device and writing a status file at request of the data storage command, (f) determining if the status file exists in the simulated storage, and (g) stopping emulating the storage device to the host computer through the first communication interface if it is determined that the status file exists.

25 Claims, 2 Drawing Sheets

INSTALLATION OF OPERATING SYSTEM ON HOST COMPUTER USING VIRTUAL STORAGE OF BMC

FIELD

The present disclosure relates generally to computer operating system installation, and particularly to installation of an operating system on a host computer using a virtual storage of a baseboard management controller.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An operating system (OS) is one of the most crucial components on a host computer, and the operating system installation on the host computer can be performed automatically through a boot program, where the operating system is stored in an OS media and hardware specific drivers are stored in a virtual storage on a baseboard management controller (BMC). The boot program of the host computer can manage installation of an operating system on the host computer. The boot program can instruct the BMC to expose a virtual storage to the host computer such that the hardware specific drivers stored in the virtual storage can be retrieved from the virtual storage of the BMC and installed on the host computer. Once the operating system is properly installed on the host computer, the BMC should be notified the installation completion such that the BMC can stop exposing the virtual storage of the BMC to the host computer. Therefore, an unaddressed need exists in the art to address the aforementioned deficiencies and inadequacies.

SUMMARY

In one aspect, the present disclosure relates to a system for installation of operating system on host computer using a virtual storage on a baseboard management controller (BMC). In certain embodiment, the system includes a BMC. The BMC has a processor, a non-volatile memory, a volatile memory, and a first communication interface. The non-volatile memory stores firmware of the BMC. When the firmware is executed at the processor, the BMC performs following operations: (a) receiving a device request from a host computer to access a storage device through a first communication interface, (b) simulating the storage device to the host computer through the first communication interface in accordance with a storage protocol according to the device request, (c) receiving a data request command from the host computer in accordance with the storage protocol directed to the simulated storage device, (d) transferring requested data to the host computer through the first communication interface in accordance with the storage protocol at the data request command, (e) receiving a data storage command from the host computer in accordance with the storage protocol directed to the simulated storage device, and writing a status file at the request of the data storage command; (f) determining if the status file exists in the simulated storage, and (g) stopping emulating the storage device to the host computer through the first communication interface if it is determined that the status file exists.

In certain embodiments, the first communication interface includes at least one of a keyboard controller style (KCS) interface, a system management interface chip (SMIC) interface, and a block transfer (BT) interface. In other embodiments, the first communication interface includes a universal serial bus (USB) interface and the storage protocol includes a USB storage protocol. The data stored in the simulated storage device include certain hardware drivers specific to the host computer.

In certain embodiments, the host computer includes a boot program. When the boot program is executed at a processor of the host computer, the boot program sends the device request to the BMC, retrieves an operating system (OS) installer from an OS media, and initiates execution of the OS installer. The OS installer is configured to perform one or more of following operations: (a) retrieving a first OS installation file from the OS media, (b) detecting the storage device simulated by the BMC through the first communication interface, (c) sending the data request command specifying a second OS installation file stored in the simulated storage device to the simulated storage device through the first communication interface, (d) receive the second OS installation file through the first communication interface, and (e) install an OS on the host computer using the first and second OS installation files. The first OS installation file is a collection of system files and the second OS installation file is a collection of hardware drivers specific to the host computer.

In certain embodiments, the boot program is configured to specify, for the OS installer, location of hardware drivers specific to the host computer at the simulated storage device. The OS installer is configured to retrieve the hardware drivers from the simulated storage device in accordance with the storage protocol. In one embodiment, the OS media is a media device local to the host computer. In another embodiment, the OS media is a media device connected to the host computer through a network.

In certain embodiments, the boot program is configured to: (a) send the device request, for simulating a storage device through the first communication interface, to the BMC through a communication protocol, (b) send the device request through the first communication interface, and (c) send the device request through a second communication interface that is different from the first communication interface. The communication protocol is in accordance with IPMI standard and the device request includes an IPMI OEM message.

In certain embodiments, the OS installer is configured to perform one or more of following operations: (a) generating a data storage command to write the status file to the simulated storage device, and (b) sending the data storage command to the BMC through the first communication interface.

In another aspect, the present disclosure relates to a baseboard management controller (BMC) implemented method of installation of operating system (OS) on a host computer using virtual storage of BMC. The method includes one or more of following operations: (a) receiving a device request from the host computer to access a storage device through a first communication interface, (b) simulating the storage device to the host computer through the first communication interface in accordance with a storage protocol according to the device request, (c) receiving a data request command from the host computer in accordance with the storage protocol directed to the simulated storage device, (d) transferring requested data to the host computer through the first communication interface in accordance with the storage protocol according to the data request command, (e) receiving a data storage command from the host computer in accordance with the storage protocol directed to the simulated storage device and writing a status file at the request of the data storage command, (f) determining if the status file exists in the simulated storage, and (g) stopping emulating the storage device to the host computer through the first communication interface if it is determined that the status file exists.

In certain embodiments, the host computer includes a boot program. When the boot program is executed at a processor of the host computer, the boot program sends the device request to the BMC, retrieves an OS installer from an OS media, and initiates execution of the OS installer. The OS installer performs one or more of following operations: (a) retrieve a first OS installation file from the OS media, (b) detect the storage device simulated by the BMC through the first communication interface, (c) send the data request command specifying a second OS installation file stored in the simulated storage device to the simulated storage device through the first communication interface, (d) receive the second OS installation file through the first communication interface, and (e) install an OS on the host computer using the first and second OS installation files. The first OS installation file is a collection of system files. The second OS installation file is a collection of hardware drivers specific to the host computer.

In certain embodiments, the boot program is configured to specify, for the OS installer, location of hardware drivers specific to the host computer at the simulated storage device. The OS installer is configured to retrieve the hardware drivers from the simulated storage device in accordance with the storage protocol. In one embodiment, the OS media is a media device local to the host computer. In another embodiment, the OS media is a media device connected to the host computer through a network. The boot program is also configured to send the device request, for simulating a storage device through the first communication interface, to the BMC through a communication protocol. The OS installer is configured to: (a) generate a data storage command to write the status file to the simulated storage device, and (b) send the data storage command to the BMC through the first communication interface.

In yet another aspect, the present disclosure relates to a non-transitory computer storage medium. The non-transitory computer storage medium stores computer-executable instructions. When these computer-executable instructions are executed by a processor of a baseboard management controller (BMC), cause the processor to: (a) receive a device request from the host computer to access a storage device through a first communication interface, (b) simulate the storage device to the host computer through the first communication interface in accordance with a storage protocol according to the device request, (c) receive a data request command from the host computer in accordance with the storage protocol directed to the simulated storage device, (d) transfer requested data to the host computer through the first communication interface in accordance with the storage protocol according to the data request command, (e) receive a data storage command from the host computer in accordance with the storage protocol directed to the simulated storage device and writing a status file at the request of the data storage command, (f) determine if the status file exists in the simulated storage, and (g) stop emulating the storage device to the host computer through the first communication interface if it is determined that the status file exists.

In certain embodiment, the host computer has a boot program. When the boot program is executed at a processor of the host computer, the boot program sends the device request to the BMC, retrieves an operating system (OS) installer from an OS media, and initiates execution of the OS installer to perform one or more of following operations: (a) retrieving a first OS installation file from the OS media, (b) detecting the storage device simulated by the BMC through the first communication interface, (c) sending the data request command specifying a second OS installation file stored in the simulated storage device to the simulated storage device through the first communication interface, (d) receiving the second OS installation file through the first communication interface, and (e) installing an OS on the host computer using the first and second OS installation files. The first OS installation file is a collection of system files. The second OS installation file is a collection of hardware drivers specific to the host computer.

In certain embodiments, the boot program is configured to specify, for the OS installer, location of hardware drivers specific to the host computer at the simulated storage device. The OS installer is configured to retrieve the hardware drivers from the simulated storage device in accordance with the storage protocol. The OS installer is configured to: (a) generate a data storage command to write the status file to the simulated storage device, and (b) send the data storage command to the BMC through the first communication interface.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings FIGS. 1-2. These accompanying drawings illustrate one or more embodiments of the present disclosure and, together with the written description, serve to explain the principles of the present disclosure. The same reference numbers may be used throughout the drawings to refer to the same or like elements of an embodiment, and wherein.

DETAILED DESCRIPTION

Figure 1:
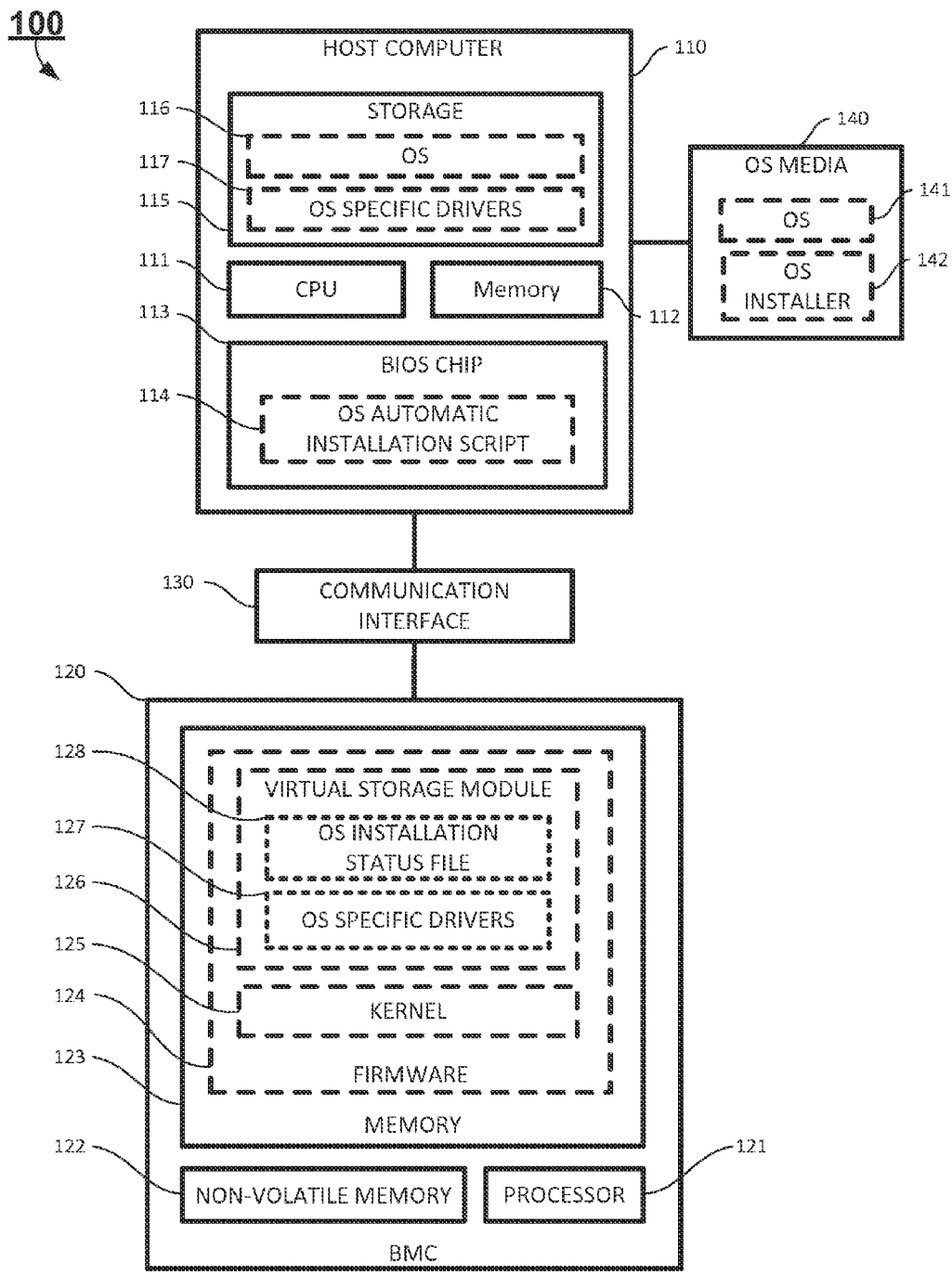
FIG. 1 schematically depicts a computer system having a host computer and a BMC according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip.

The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

An operating system (OS) is one of the most crucial components on a host computer, and the operating system installation on the host computer can be performed automatically through a boot program, where the operating system is stored in an OS media and hardware specific drivers are stored in a virtual storage on a baseboard management controller (BMC). The boot program of the host computer can manage installation of an operating system on the host computer. The boot program can instruct the BMC to expose a virtual storage to the host computer such that the hardware specific drivers stored in the virtual storage can be retrieved from the virtual storage of the BMC and installed on the host computer. Once the operating system is properly installed on the host computer, the BMC should be notified the installation completion such that the BMC can stop exposing the virtual storage of the BMC to the host computer. In certain embodiments, the host computer with IPMI tool on the installer can use IPMI OEM commands to notify the BMC of operating system installation completion. But different IPMI tools may need to be run based on the OS being installed. Further, the IPMI tools need to be available on the host computer at the installation time of the OS, which can be complex to implement. Furthermore, the host computer may need to be powered down during the operating system installation and therefore, counting a system reboot as an indication of installation completion may not be reliable.

In one aspect, the present disclosure relates to a system to use a boot program to install an operating system on a host computer. FIG. 1 schematically depicts a computer system according to certain embodiments of the present disclosure. As shown in FIG. 1, the computer system 100 includes a host computer 110 and a baseboard management controller (BMC) 120. The BMC 120 is connected to the host computer 110 via a communication interface 130. In certain embodiments, the communication interface 130 can be one or more of a keyboard controller style (KCS) interface, a system management interface chip (SMIC) interface, a block transfer (BT) interface, and a universal serial bus (USB) interface. Of course, the communication interface 130 can be other types of suitable interfaces as known by one skilled in the art.

In certain embodiments, the system 100 can be a system that incorporates more than one interconnected system through a network, such as a client-server network. The network may be a wired or wireless network, and may be of various forms such as a local area network (LAN) or wide area network (WAN) including the Internet. In certain embodiments, the system 100 may include other physical or virtual components not shown in FIG. 1.

The host computer 110 may be a computing device, such as a general purpose computer or a headless computer. Generally, the host computer 110 includes a baseboard or the "motherboard" (not shown). The baseboard is a printed circuit board to which a nm multitude of components or devices may be connected by way of a system bus or other electrical communication paths. Although not explicitly shown in FIG. 1, the components on the baseboard are interconnected, and the layout of the components on the baseboard and the manner of the interconnection between the components on the baseboard is herein referred to as the configuration of the baseboard. One of ordinary skill in the art would appreciate that the configuration of the baseboard may be adjusted or changed according to the necessary design or manufacturing requirements.

The components on the baseboard of the host computer 110 include, but not limited to, a central processing unit (CPU) 111, a memory 112, a BIOS chip 113, a storage 115, and other required, known components such as Input/Output (I/O) modules (not shown).

In certain embodiments, the host computer 110 is connected with an OS media device 140. The OS media device 140 contains an operating system image 141 to be installed on the host computer 110, and an operating system installer 142 for installing the operating system image 141. In one embodiment, the OS media is a media device local to the host computer, such as a hard drive or a solid state storage device. In another embodiment, the OS media is a remote media device connected to the host computer through a network.

The CPU 111 is a processor configured to control operation of the host computer 110. The CPU 111 runs the operating system on the host computer or other applications of the host computer 110. In certain embodiments, the host computer 110 may run on or more than one CPU as the host processor, such as two CPUs, four CPUs, eight CPUs, or any suitable number of CPUs.

The memory 112 can be a volatile memory, such as the random-access memory (RAM), for storing the data and information during the operation of the host computer 110. In certain embodiments, the memory 112 is in communication with the CPU 111 through a system bus (not shown).

In certain embodiments, the storage 115 is a non-volatile storage device. Examples of the storage 115 may include flash memory, memory cards, USB drives, hard drives, floppy disks, optical drives, or any other types of data storage devices. The storage 115 can store various software applications. In one embodiment, an operating system (OS) is installed and stored in a first portion 116 of the storage 115, and various hardware specific drivers are stored in a second portion 117 of the storage 115. In certain embodiments, the host computer 110 may include at least one I/O device (not shown) for generating and controlling input and output signals of the host computer 110. Examples of the I/O device include keyboards, touch pads, mouse, microphones, display screens, touch screens, or other I/O devices applicable for the host computer 110. Some I/O devices, such as touch screens, are provided for the dual input/output purpose.

The operating system can be collective management software managing the operation of the host computer 110. For example, the operating system can include a set of functional programs that control and manage operations of the devices connected to the host computer 110. The set of application programs provide certain utility software for the user to manage the host computer 110. In certain embodiments, the operating system is operable to multitask, i.e., execute computing tasks in multiple threads, and thus may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," and "WINDOWS 8," operating systems, IBM's OS/2 WARP, APPLE's MACINTOSH OSX operating system, LINUX, UNIX, etc.

In certain embodiments, the BIOS chip 113 is a non-volatile memory, such as a flash memory chip, an electrically erasable programmable read-only memory (EEPROM) chip, or a complementary metal oxide semiconductor (CMOS) memory. In certain embodiments, as shown in FIG. 1, the BIOS chip 113 stores at least Basic Input/Output System (BIOS) or other booting software and optionally an operating system automatic installation script 114. For sake of brevity, BIOS software and other booting software are all referred to as BIOS hereafter. The operating system automatic installation script 114, can instruct the BIOS to perform operating system installation on the host computer 110.

The BIOS contains computer code, when executed at the CPU 111, that is configured to perform booting functions for the host computer 110. The BIOS can also contain a core that performs various functions such as executing a script. The installation functions include, but not limited to, one or more of following functions: the initiation and power-on self-test, identifying the system devices; locating the operating system automatic installation script 114; loading and executing the operating system automatic installation script 114 to install the operating system; and power cycle to complete the installation of the operating system on the host computer 110. The operating system can be installed manually (attended) or automatically (unattended). For unattended operating system installation, in certain embodiments, the BMC sends instruction to the host computer 110 to reboot the host computer 110, and when the host computer 110 boots up, the BIOS executes the operating system automatic installation script 114 of the BIOS chip 113 to install the operating system onto the host computer 110.

In certain embodiments, the BIOS performs startup or the booting functions. In the booting process, the BIOS performs a power-on self-test operation, which initializes and identifies the system hardware devices of the host computer 110, such as the CPU 111, the memory 112, the storage 115, peripheral I/O devices such as display card, keyboard and mouse, and other hardware devices. In certain embodiments, the BIOS may identify the storage 115, which stores the operating system in the first portion 116 of the storage 115, as a bootable device. Once the BIOS completes the self-test operation, the BIOS then attempts to boot the host computer 110, i.e., instructs the CPU 111 to read and execute the OS from the bootable device such as the storage 115 as specified in the BIOS. Typically, the BIOS attempts to load a boot loader program from the storage 115. The boot loader program then loads the operating system from the storage 115. Thus, the CPU 111 can execute the operating system and run an instance of the operating system. At the end of the booting process, the control of the computer system is given to the operating system.

In certain embodiments, the CPU 111, the memory 112, and the BIOS chip 113 may be embedded on the baseboard, or may be connected to the baseboard through at least one interface. In certain embodiments, the interface may be physical hardware interface such as electrical connectors, buses, ports, cables, terminals, or other I/O devices. In certain embodiments, the BMC 120 may also be a component on the baseboard.

The BMC 120 is a specialized microcontroller that manages the interface between system management software and platform hardware. Different types of sensors can be built into the host computer 110, and the BMC 120 reads these sensors to obtain parameters such as temperature, cooling fan speeds, power status, operating system status, etc.

The BMC 120 monitors the sensors and can send out-of-band (OOB) alerts to a system administrator of the host computer 110 if any of the parameters do not stay within preset limits, indicating a potential failure of the host computer 110. In certain embodiments, the administrator can also remotely communicate with the BMC 120 from a remote management computer (not shown) via a network to take remote action to the host computer 110. For example, the administrator may reset the host computer 110 from the remote management computer through the BMC 120, and may obtain system information of the host computer 110 OOB without interrupting the operation of the host computer 110.

In certain embodiments, the BMC 120 has at least a processor 121, a non-volatile memory 122, and a memory 123. The processor 121 controls operation of the BMC 120. The processor 121 can execute the firmware 126 or other code stored in the BMC 120. In certain embodiments, the BMC 120 may run on more than one processor. The memory 123 can be a volatile memory, such as the RAM, for storing the data and information during the operation of the BMC 120. When the BMC 120 restarts, the content stored in the memory 123 may be lost. The BMC 120 has various system devices: such as interfaces, buses, and storage devices. Any device of the BMC 120 can be accessible by the host computer 110 through a communication interface.

The non-volatile memory 122 stores the firmware 124 of the BMC 120. When the processor 121 of the BMC 120 is powered up, the firmware 124 of the BMC 120 is loaded into the memory 123 and executed. The firmware 124 of the BMC 120 has at least a kernel 125 and a virtual storage module 126. In certain embodiments, various hardware specific drivers 127 are accessible through the virtual storage module 126. These hardware specific drivers 127 are a part of the operating system installation, in addition to the operating system files stored in the OS media device 140.

In certain embodiments, the BMC 120 can use the virtual storage module 126 to simulate a storage device (such as a USB drive) that can be accessed by the host computer 110. In certain embodiments, if the BMC has not simulated a storage device accessible by the host computer 110, the host computer 110 can send a request to the BMC 120 to expose the virtual storage module 126 to the host computer 110. The virtual storage module 126 can send to and receive from the host computer 110 signals and data through the communication interface in accordance with a specific storage device protocol, thus emulating a storage device under that protocol. For example, the virtual storage module 126 can communicate with the host computer 110 through the USB communication interface, thus emulating a USB drive. The host computer 110 can write data to and read data from to the virtual storage module 126 using standard USB storage device commands. Therefore, the host computer 110 perceives the virtual storage module 126 as a typical USB drive. In certain embodiments, the virtual storage module 126 can also emulate CD-ROMs, SD memories, tape drives, etc.

In certain embodiments, the BMC 120 may use the virtual storage module 126 to make available certain hardware specific drivers 127 for the host computer 110. For example, the host computer 110 can detect the virtual storage module 126 and perceives it as a real physical media. Then, the host computer 110 may read a file from the virtual storage module 126. In certain embodiments, the file information includes the file system structure, e.g., a list of filenames of the virtual media module 126.

When the host computer 110 attempts to retrieve a specific file from the virtual storage module 126, the host computer will send a read operation (or command) to the communication interface 130 in accordance with a specific storage device protocol, specifying a file to be retrieved. The virtual storage module 126 then receives such a read operation initiated by host computer 110 through the communication interface 130. The virtual storage module 126 instruct the BMC 120 to locate the file, and then sends the requested file back to the host computer 110 through the communication interface 130.

In certain embodiments, the BMC 120 can be used to assist installation of an operating system on the host computer 110. An operating system automatic installation script 114 on the BIOS chip 113 of the host computer 110 can be executed by the BIOS core to perform certain installation functions at the CPU 111. The operating system automatic installation script 114 contains instructions to: (a) request the BMC 120 to expose (make available) the virtual storage module 126 for the host computer 110 through a communication interface 130; (b) retrieve an operating system installer 142 on an OS media device 140 for operating system installation; and/or (c) run the operating system installer 142 at the CPU 111 of the host computer 110 to install the operating system.

In certain embodiments, after the BMC 120 receives a device request from the host computer 110 to expose the virtual storage module 126 through the communication interface 130, the BMC 120 exposes the virtual storage module 126 to the host computer 110. In one embodiment, the communication interface 130 is a USB interface. The BMC 120 configures the virtual media module 126 as a USB drive. Then the hardware specific drivers 127 on the virtual storage module 126 can be accessed by the host computer 110 through the USB interface. The data stored in the virtual storage module 126 include various hardware specific drivers and other supporting documents. In another embodiment, the BIOS core sends the device request through another communication interface (not shown) different from the communication interface 130. This communication interface can be a keyboard controller style (KCS) interface, a system management interface chip (SMIC) interface, and a block transfer (BT) interface, universal serial bus (USB) interface, or PCI/PCIe interface.

In certain embodiments, the automatic installation script 114 instructs the BIOS core to retrieve the OS installer 142 from the OS media device 140, and then transfer the control of the CPU 111 to the OS installer 142. The automatic installation script 114 instructs the BIOS core to communicate with the BMC 120 through a communication chancel established between the host computer 110 and BMC 120. For example, the communication channel can be established in accordance with Intelligent Platform Management Interface (IPMI) protocols. IPMI is an industry standard for system monitoring and event recovery. The IPMI specification provides a common message-based interface for accessing all of the manageable features in a compatible computer. IPMI includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a BMC 120 through an operating system or through an external connection, such as through a network or serial connection. Additional details regarding IPMI can be found in the IPMI Specification (Version 2.0), which is publicly available from INTEL CORPORATION, and which is incorporated herein by reference.

Through IPMI messages, especially IPMI OEM messages, the BIOS core can, as instructed by the automatic installation script 114, request the BMC 120 to expose the virtual storage module 126 to the host computer 110. The BIOS core can also, as instructed by the automatic installation script 114, inform or configure the OS installer 142 to retrieve the hardware specific drivers from the exposed virtual storage module 126. In certain embodiments, the BIOS core can, as instructed by the automatic installation script 114, inform or configure the OS installer 142 to write a status file to the virtual storage module 126, indicating the OS installation is complete.

When it is executed at the CPU of the host computer 110, the OS installer 142 performs one or more of following operations: (a) retrieving a copy of the operating system image 141 from the OS media device 140, (b) installing the copy of the operating system image 141 in the storage 115 of the host computer 110, (c) retrieving the hardware specific drivers 127 from the virtual storage module 126 of the BMC 120 via the communication interface 130, and (d) installing the hardware specific drivers 127 from the virtual storage module 126 of BMC 120 in the storage 115 of the host computer 110. Once the operating system is installed on the host computer 110, the operating system installer 142, or the underlying software running the operating system installer 142 core, can write an operating system installation status file 128 (for example: OSInstallationStatus) on the virtual storage module 126 as an indication of the completion of the installation of the operating system and operating system related drivers. This can be implemented by the OS installer 142 using a simple shell command. For example:

$>echo "OS installation completed, successfully">/<path to virtual storage module>/OSInstallationStatus Here, the content of the "OSInstallationStatus" file is "OS installation completed, successfully", and the script used can be a shell script, a batch script, or a PowerShell script. Once the above shell script command is executed, the host computer 110 may be rebooted to allow the newly installed operating system to take effect.

More specifically, the OS installer 142 perceives the simulated (virtual) storage device 126 by the BMC 120 as a typical storage device. The OS installer 142 creates a status file using its file system and writes the status file 128 to the simulated storage device 126 in accordance with a storage protocol just as it writes to a typical storage device (e.g., USB drive) through a data storage command (e.g. "write" command). The virtual storage module 124 of the BMC 120 monitors the communication interface 130 and detects any command coming to the communication interface 130 in accordance with the data storage protocol. Using the USB protocol as an example, the virtual storage module 126 will receive at the communication interface 130 a USB write command initiated by the host computer 110. The virtual storage module 124 then interprets the write command and determines the data to be stored and location at the BMC 120 to store the data. For example, the location can be at a specific address of the memory 123 or the non-volatile memory 122. Then, the virtual storage module 126 stores the data at the specific address, completing the write command initiated by the host computer 110.

The BMC 120 checks the virtual storage module 126 periodically to see if the operating system installation status file 128 exists. For example, the BMC 120 checks if any data, for example, the operating system installation status file 128, exist at the specific location of the memory 123 or the non-volatile memory 122. If the operating system installation status file 128 exists on the virtual storage module 126, it means the operating system installation is completed on the host computer 110. In certain embodiments, the BMC 120 can further make that determination based on the content of the status file 128. For example, if the content of the status file 128 matches a pre-configured value (e.g. "OS installation completed, successfully"), then the BMC 120 determines that the operating system installation is completed on the host computer 110. Accordingly, the BMC 120 can stop emulating the storage drive that makes available the hardware specific drivers to the host computer 110. In this way, when the host computer 110 reboots after the successful installation of the OS, it will not detect the virtual storage 126 emulated by the BMC 120.

In another aspect, the present disclosure relates to a method of installing an operating system on a host computer with a BMC. In certain embodiments, the method includes one or more of following operations: (a) receiving, at the BMC 120, a device request from the host computer 110 to access a virtual storage through the communication interface 130; (b) emulating, at the BMC 120, a storage to the host computer through the communication interface 130; (c) transferring data stored in the virtual storage of the BMC 120 to the host computer 110 through the communication interface 130; (d) detecting periodically if an operating system installation status file exists at the virtual storage of the BMC 120; and (e) stop emulating the virtual storage at the BMC if the operating system installation status file exists. In certain embodiments, the data stored in the virtual storage 126 of the BMC 120 contains various hardware specific drivers and other OS installation supporting files.

Figure 2:
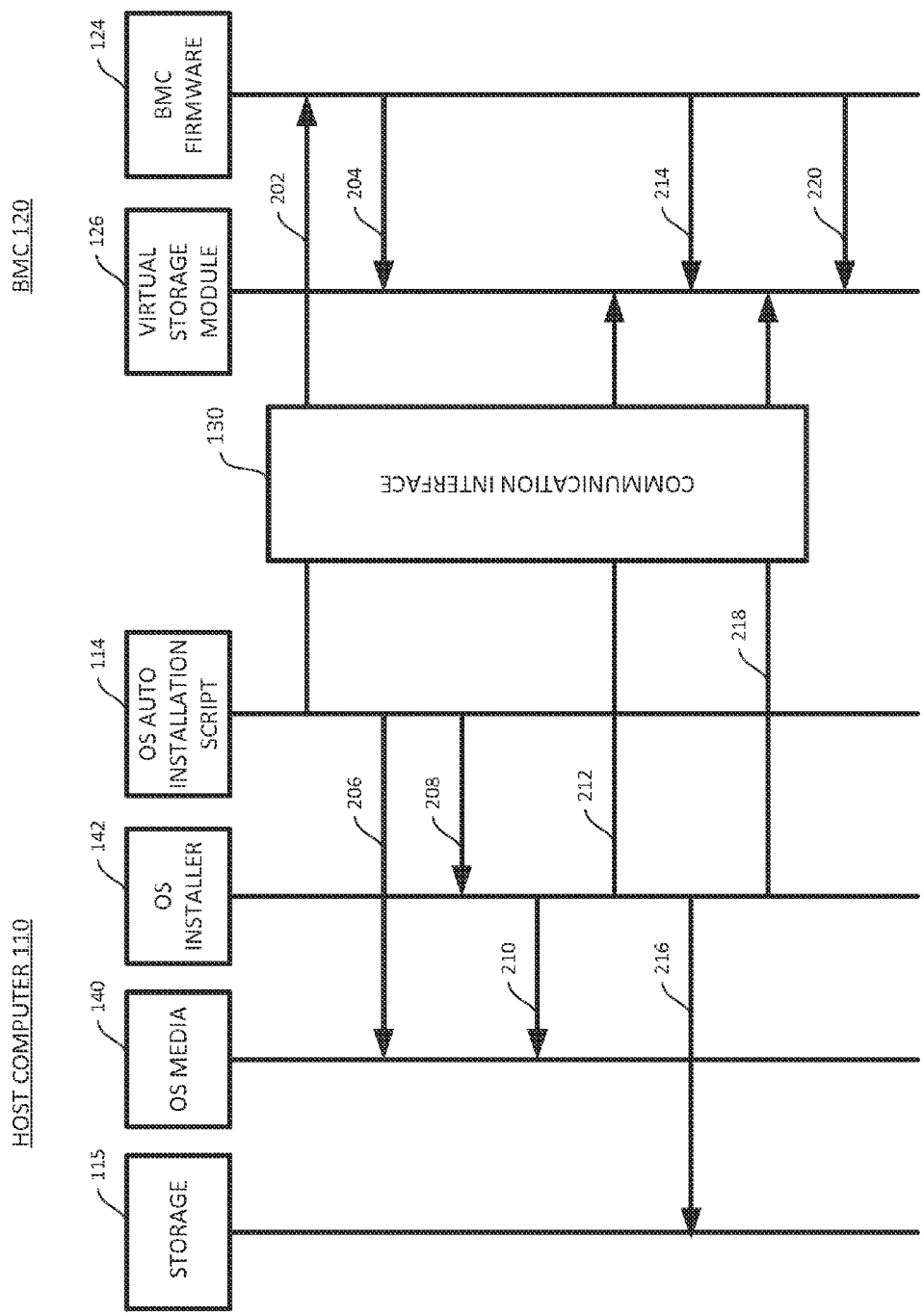
FIG. 2 schematically depicts data transfer between various components of the host computer and the BMC according to certain embodiments of the present disclosure.

FIG. 2 schematically depicts command and data transfer between various components of the host computer 110 and the BMC 120 according to certain embodiments of the present disclosure. At the beginning, once the host computer 110 is powered up for operating system installation, the CPU 111 of the host computer 110 loads the BIOS and the operating system automatic installation script 114 from the BIOS chip 113. In one embodiment, the operating system automatic installation script 114 then instructs the BIOS core to send a device request 202 over a communication interface 130 to the BMC 120, requesting the BMC 120 to expose a virtual storage module 126 to the host computer 110 and make various hardware specific drivers 127 for installation available to the host computer 110.

In operation 204, the BMC firmware 124 receives the request 202 from the host computer 110 and use the virtual storage module 126 to emulate a storage device to the host computer 110 through the communication interface 130, thus making various hardware specific drivers 127 accessible to the host computer. In operation 206, the operating system automatic installation script 114 instructs the BIOS core to access the OS media device 140 to retrieve the operating system installer 142 from the OS media device 140.

In operation 208, the operating system automatic installation script 114 instructs the BIOS core to initiate the operating system installer 142, and gives control of the CPU 111 to the operating system installer 142. In operation 210, the operating system installer 142 accesses the OS media 140 to retrieve a copy of the operating system image 141 from the OS media device 140. In operation 212, the operating system installer 142 accesses the virtual storage module 126 of the BMC 120 to retrieve various hardware specific drivers 127 from the virtual storage module 126 of the BMC 120 through the communication interface 130.

In operation 214, the BMC firmware 124 checks the virtual storage module 126 periodically to see if an operating system installation status file exists on the virtual storage 126. At this time, the BMC firmware 124 has not detected the operating system installation status file in the virtual storage module 126 written by the host computer 110. In operation 216, the operating system installer 142 installs the copy of operating system file 141 from the OS media device 140 to the first portion 116 of the storage 115 of the host computer 110, and the hardware specific drivers 127 from the virtual storage module 126 of the BMC 120 to the second portion 117 of the storage 115 of the host computer 110, respectively.

In operation 218, after the operating system installer 142 successfully installed the OS on the host computer 110, it writes the operating system installation status file 128 in the virtual storage module 126 of the BMC 120 over the communication interface 130. As indicated earlier, in operation 220, the BMC firmware 124 periodically checks the existence of the operating system installation status file 128. Once the BMC firmware 124 detects the existence of the operating system installation status file 128, the BMC firmware 124 stops emulating the storage to the host computer 110 through the communication interface 130. Therefore, after installation (e.g., when the host computer 110 reboots), the host computer 110 will not detect the virtual storage drive of the BMC 120.

In yet another aspect, the present disclosure relates to a non-transitory computer storage medium. The non-transitory computer storage medium stores computer-executable instructions. When these computer-executable instructions are executed by a processor 121 of the BMC 120, these computer-executable instructions cause the processor 121 to perform one or more of following operations: (a) receiving a device request at the BMC 120 from the host computer 110 to access a virtual storage 126 through a communication interface 130; (b) exposing the virtual storage 126 to the host computer 110 through the communication interface 130; (c) transferring the data, which include hardware specific drivers and other installation supporting files, stored in the virtual storage 126 of the BMC 120 to the host computer 110 through the communication interface 130 in response to a data retrieval command in accordance with a common storage protocol (e.g. USB) from the host computer 110; (d) receiving a write command from the host computer 110 at the BMC 120 for writing an operating system installation status file 128 in the virtual storage 126; (e) detecting periodically if the operating system installation status file 128 exists at the virtual storage 126 of the BMC 120, and (f) in response to detecting the operating system installation status file 128, stop emulating the storage drive 126 at the BMC 120.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
   a baseboard management controller (BMC) having a processor, a non-volatile memory, a volatile memory, and a first communication interface, wherein the non-volatile memory stores firmware of the BMC, when executed at the processor, configured to perform following operations:
   receiving a data request command from a host computer in accordance with a storage protocol directed to a simulated storage device simulated by the BMC;
   in response to the data request command, transferring requested data to the host computer through the first communication interface in accordance with the storage protocol;
   receiving a data storage command from the host computer in accordance with the storage protocol directed to the simulated storage device, wherein the data storage command requests writing a status file indicating an OS installation is completed on the host computer to the simulated storage device;
   in response to receiving the data storage command, writing the status file indicating the OS installation is completed on the host computer to the simulated storage device;
   determining if the status file exists in the simulated storage; and
   in response to determining that the status file exists, stopping emulating the storage device to the host computer through the first communication interface; and
   the host computer, configured to
   in response to completion of the OS installation on the host computer, sending to the BMC the data storage command requesting writing, to the simulated storage, a status file indicating the OS installation is completed on the host computer.

2. The system as claimed in claim 1, wherein the first communication interface includes at least one of a keyboard controller style (KCS) interface, a system management interface chip (SMIC) interface, and a block transfer (BT) interface.

3. The system as claimed in claim 1, wherein the first communication interface includes a universal serial bus (USB) interface and the storage protocol includes a USB storage protocol.

4. The system as claimed in claim 1, wherein the data stored in the simulated storage device include a plurality of hardware drivers specific to the host computer.

5. The system as claimed in claim 1, wherein the host computer includes
a boot program configured to, when executed at a processor of the host computer, send the device request to the BMC, retrieve an operating system (OS) installer from an OS media, and initiate execution of the OS installer.

6. The system as claimed in claim 5, wherein the OS installer is configured to
retrieve a first OS installation file from the OS media;
detect the storage device simulated by the BMC through the first communication interface;
send the data request command to the simulated storage device through the first communication interface, wherein the data request command specifying a second OS installation file stored in the simulated storage device;
receive the second OS installation file through the first communication interface; and
install an OS on the host computer using the first and second OS installation files.

7. The system as claimed in claim 6, wherein the boot program is configured to specify, for the OS installer, location of hardware drivers specific to the host computer at the simulated storage device; wherein the OS installer is configured to retrieve the hardware drivers from the simulated storage device in accordance with the storage protocol.

8. The system as claimed in claim 7, wherein the OS media is a media device local to the host computer.

9. The system as claimed in claim 7, wherein the OS media is a media device connected to the host computer through a network.

10. The system as claimed in claim 6, wherein the boot program is configured to send the device request, for simulating a storage device through the first communication interface, to the BMC through a communication protocol.

11. The system as claimed in claim 10, wherein the boot program is configured to send the device request through the first communication interface.

12. The system as claimed in claim 10, wherein the boot program is configured to send the device request through a second communication interface that is different from the first communication interface.

13. The system as claimed in claim 10, wherein the communication protocol is in accordance with IPMI standard and the device request includes an IPMI OEM message.

14. The system as claimed in claim 6, wherein the OS installer is configured to
generate a data storage command to write the status file to the simulated storage device; and
send the data storage command to the BMC through the first communication interface.

15. The system as claimed in claim 14, wherein the first OS installation file is a collection of system files and the second OS installation file is a collection of hardware drivers specific to the host computer.

16. A baseboard management controller (BMC) implemented method of installing an operating system (OS) on a host computer using virtual storage of BMC, comprising:
receiving a data request command from a host computer in accordance with a storage protocol directed to a simulated storage device simulated by the BMC;
in response to the data request command, transferring requested data to the host computer through the first communication interface in accordance with the storage protocol;
in response to completion of an OS installation on the host computer, sending to the BMC a data storage command requesting writing a status file, to the simulated storage, indicating the OS installation is completed on the host computer;
receiving the data storage command from the host computer in accordance with the storage protocol directed to the simulated storage device;
in response to receiving the data storage command, writing the status file indicating the OS installation is completed on the host computer to the simulated storage device;
determining if the status file exists in the simulated storage; and
in response to determining that the status file exists, stopping emulating the storage device to the host computer through the first communication interface.

17. The BMC implemented method of claim 16, wherein the first communication interface includes at least one of a keyboard controller style (KCS) interface, a system management interface chip (SMIC) interface, and a block transfer (BT) interface, and a universal serial bus (USB) interface using a USB storage protocol.

18. The BMC implemented method of claim 17, wherein the host computer includes a boot program configured to, when executed at a processor of the host computer, send the device request to the BMC, retrieve an OS installer from an OS media, and initiate execution of the OS installer to perform following operations:
retrieving a first OS installation file from the OS media, wherein the first OS installation file is a collection of system files;
detecting the storage device simulated by the BMC through the first communication interface;
sending the data request command to the simulated storage device through the first communication interface, wherein the data request command specifying a second OS installation file stored in the simulated storage device, wherein the second OS installation file is a collection of hardware drivers specific to the host computer;
receiving the second OS installation file through the first communication interface; and
installing an OS on the host computer using the first and second OS installation files.

19. The BMC implemented method of claim 18, wherein the boot program is configured to specify, for the OS installer, location of hardware drivers specific to the host computer at the simulated storage device; wherein the OS installer is configured to retrieve the hardware drivers from the simulated storage device in accordance with the storage protocol, and wherein the OS media comprises a media device local to the host computer, and a media device connected to the host computer through a network.

20. The BMC implemented method of claim 18, wherein the boot program is configured to send the device request, for simulating a storage device through the first communication interface, to the BMC through a communication protocol.

21. The BMC implemented method of claim 18, wherein the OS installer is configured to
   generate a data storage command to write the status file to the simulated storage device; and
   send the data storage command to the BMC through the first communication interface.

22. A non-transitory computer storage medium having computer-executable instructions stored thereon which, when executed by a process of a baseboard management controller (BMC), cause the processor to:
   receive a data request command from a host computer in accordance with a storage protocol directed to a simulated storage device simulated by the BMC;
   in response to the data request command, transfer requested data to the host computer through the first communication interface in accordance with the storage protocol;
   in response to completion of an OS installation on the host computer, send to the BMC a data storage command requesting writing a status file, to the simulated storage, indicating the OS installation is completed on the host computer;
   receive the data storage command from the host computer in accordance with the storage protocol directed to the simulated storage device;
   in response to receiving the data storage command, write the status file indicating the OS installation is completed on the host computer to the simulated storage device;
   determine if the status file exists in the simulated storage; and
   in response to determining that the status file exists, stop emulating the storage device to the host computer through the first communication interface.

23. The non-transitory computer storage medium of claim 22, wherein the host computer includes a boot program configured to, when executed at a processor of the host computer, send the device request to the BMC, retrieve an operating system (OS) installer from an OS media, and initiate execution of the OS installer to perform following operations:
   retrieving a first OS installation file from the OS media, wherein the first OS installation file is a collection of system files;
   detecting the storage device simulated by the BMC through the first communication interface;
   sending the data request command to the simulated storage device through the first communication interface, wherein the data request command specifying a second OS installation file stored in the simulated storage device, wherein the second OS installation file is a collection of hardware drivers specific to the host computer;
   receiving the second OS installation file through the first communication interface; and
   installing an OS on the host computer using the first and second OS installation files.

24. The non-transitory computer storage medium of claim 23, wherein the boot program is configured to specify, for the OS installer, location of hardware drivers specific to the host computer at the simulated storage device; wherein the OS installer is configured to retrieve the hardware drivers from the simulated storage device in accordance with the storage protocol, and wherein the OS media comprises a media device local to the host computer, and a media device connected to the host computer through a network.

25. The non-transitory computer storage medium of claim 23, wherein the OS installer is configured to
   generate a data storage command to write the status file to the simulated storage device; and
   send the data storage command to the BMC through the first communication interface.

* * * * *